Oct. 9, 1923.

C. F. BRITZWEIN 1,469,885

FISHING LINE FLOAT

Filed Sept. 26, 1921

Inventor:
Christian F. Britzwein
By Fred'k J. Harcum
Attorney.

Patented Oct. 9, 1923.

1,469,885

UNITED STATES PATENT OFFICE.

CHRISTIAN F. BRITZWEIN, OF ST. LOUIS, MISSOURI, ASSIGNOR OF ONE-HALF TO CHARLES H. VOSS, OF ST. LOUIS, MISSOURI.

FISHING-LINE FLOAT.

Application filed September 26, 1921. Serial No. 503,121.

*To all whom it may concern:*

Be it known that I, CHRISTIAN F. BRITZWEIN, a citizen of the United States, residing in the city of St. Louis and State of Missouri, have invented certain new and useful Improvements in Fishing - Line Floats, of which the following is a specification.

My invention relates to fishing-line floats, and, has for its object to provide a pneumatic deflatable float.

A further object of the invention is the provision of a deflatable float made from rubber.

A further object of the invention is the provision of novel means for readily inflating the float, and, for deflating the float.

A still further object of the invention is the provision of novel means for securely fixing the elastic deflatable float to the float stem.

A still further object of the invention is the provision of novel means which will permit of the removal of the float from the float stem, and vice-versa.

With the above and other objects in view, the invention consists in the novel features of construction, arrangement and combination of parts hereinafter more fully described and finally pointed out in the claim hereto appended.

Referring to the accompanying drawings forming a part of this specification wherein like characters of reference denote similar parts throughout the several views.

Figure 1:
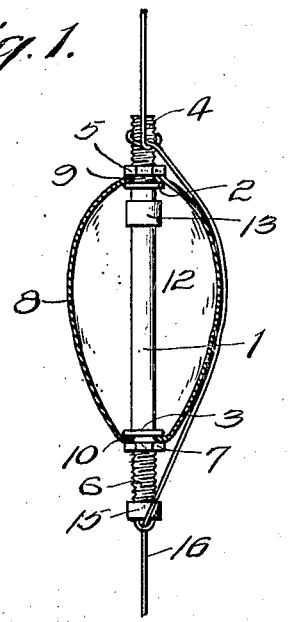
Fig. 1, is a view partly in side elevation and partly in section of an inflated float constructed in accordance with my invention.
Figure 2:
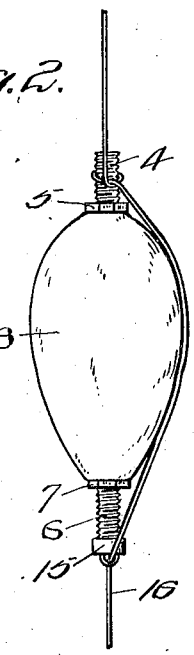
Fig. 2, is a side elevation of the float inflated.
Figure 3:
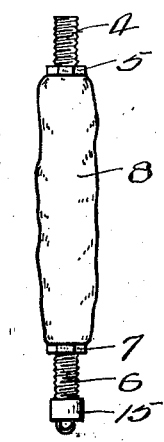
Fig. 3, is a side elevation of the float in its deflated state.

In carrying out the aim of my invention, I employ a suitable, preferably cylindrical stem 1 having the peripheral flanges 2 and 3 located a suitable distance from either end of the stem 1. The upper end of the stem is preferably provided with screw threads 4 and the securing nut 5, while the lower end of the stem is preferably provided with the screw threads 6 and the securing nut 7.

The reference character 8 indicates a suitable hollow elastic float having the aligned end openings 9 and 10 for receiving the upper and lower ends 4 and 5, respectively, of the stem 1, as shown in Fig. 1. It will be observed that the ends of the float 8 are receivable between the peripheral shoulders 2 and 3 and the securing nuts 5 and 7 which can be tightened against the rubber body of the float to prevent leakage of air from within outward.

The means employed to permit inflation of the float consists of an air passage 11 extending from the upper end face of the stem 1 to a point below the shoulder 2 where it terminates at a right angle thereto and communicates with the interior air chamber 12 of the float 8. The inner end of the intake air passage 11 is covered by means of a suitable rubber band 13 acting as a check valve to prevent leakage of air from the air chamber 12 of the float 8.

Figure 4:
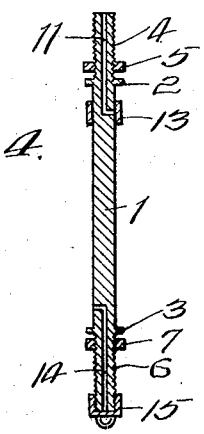
Fig. 4, is a sectional view of the float stem.

14 indicates an air discharge passage formed in the stem 1 and extends from a suitable point above the flange 3 to the lower free face of the stem 1, as clearly shown in Fig. 4. The lower end 6 of the stem 1 is preferably provided with a suitable screw threaded cap 15 to prevent the discharge of air from within the float 8 until the cap is removed.

To inflate the float 8, all that is necessary is to place the upper end 4 of the stem 1 into the mouth and blow air into the chamber 12 of the float by way of the passage 11. The pressure of the air will raise the rubber band 13 permitting it to enter the chamber 12 to inflate the float.

16 indicates the fish cord, or line which is suitably connected to the stem 1, as is manifest.

From the foregoing description, it will be observed that I provide a pneumatic float for fishing lines, nets and the like, which is simple in construction, durable, highly efficient for the purposes intended, and, a float which can be readily deflated when not in use, and readily inflated to the desired size at will.

The many advantages of the herein described invention will readily suggest themselves to those skilled in the art to which it appertains.

I do not wish to be understood as having limited myself to the details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications as may fairly fall within the scope of the appended claim when fairly construed.

What I claim is:

In combination with a stem having an air inlet passage, and an outlet passage, a valve for said inlet passage, a closure cap for said outlet passage and an elastic inflatable-deflatable float carried by said stem.

In testimony whereof, I have hereunto signed my name to the specification.

CHRISTIAN F. BRITZWEIN.